(12) United States Patent
Wusirika (10) Patent No.: US 9,660,864 B2
(45) Date of Patent: May 23, 2017

(54) STAGED PORT INITIATION OF INTER SWITCH LINKS

(75) Inventor: Balakrishna Wusirika, Pleasanton, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 929 days.

(21) Appl. No.: 12/580,962

(22) Filed: Oct. 16, 2009

(65) Prior Publication Data

US 2011/0090804 A1 Apr. 21, 2011

(51) Int. Cl.
| | | |
|---|---|---|
| H04L 12/28 | (2006.01) | |
| H04L 12/24 | (2006.01) | |
| H04L 12/709 | (2013.01) | |
| H04L 12/933 | (2013.01) | |
| H04L 12/26 | (2006.01) | |

(52) U.S. Cl.
CPC ........ *H04L 41/0806* (2013.01); *H04L 45/245* (2013.01); *H04L 49/15* (2013.01); *H04L 43/0817* (2013.01)

(58) Field of Classification Search
CPC ... H04L 41/0806; H04L 49/15; H04L 45/245; H04L 43/0817

USPC ........ 370/468, 235, 252, 392; 709/218, 227, 709/229

See application file for complete search history.

(56) References Cited

U.S. PATENT DOCUMENTS

| | | | |
|---|---|---|---|
| 2004/0024908 A1* | 2/2004 | Valdevit et al. | 709/248 |
| 2005/0073963 A1* | 4/2005 | Goodfellow et al. | 370/255 |
| 2007/0097952 A1* | 5/2007 | Truschin et al. | 370/351 |

OTHER PUBLICATIONS

"Fibre Channel Switch Fabric—5 (FC-SW-5)", Rev. 8.5, (Jun. 3, 2009); pp. 1-22 and pp. 34-230; working proposed draft American National Standard for Information Technology.

* cited by examiner

*Primary Examiner* — Luat Phung
(74) *Attorney, Agent, or Firm* — Blank Rome, LLP (57) ABSTRACT

A fabric having switches interconnected with multiple parallel interswitch links can be configured using staged port bring up. Only one of the multiple parallel interswitch links between any two switches and the corresponding switch ports can be selected and initialized. The fabric can be configured with the selected ISLs. Once the fabric has stabilized, unselected ISLs and the corresponding switch ports can be incrementally initialized. The number of unselected ISLs to be initialized can be determined based on the available computing resources of the fabric switches.

29 Claims, 4 Drawing Sheets

STAGED PORT INITIATION OF INTER SWITCH LINKS

BACKGROUND OF THE INVENTION

1. Field of the Invention

The present invention relates generally to storage area networks. Particularly, the present invention relates to initialization of inter-switch links.

2. Description of the Related Art

Storage networks can comprise several Fibre Channel switches interconnected in a fabric topology. These switches are interconnected by a number of inter-switch links (ISLs), which carry both data and control information. The control path provides connectivity among the switching elements and presents the fabric as a single entity to the end devices. The data paths provide throughput to the end devices connected to the fabric.

For higher throughput, switching elements are often interconnected with parallel redundant ISLs. ISLs terminate at switch ports connected to each switch. These parallel ISLs between a pair of switches can be treated as a single logical interconnection with increased bandwidth. In addition, the increased redundancy can enhance reliability against ISL failures. However, parallel ISLs require multiple resources for the initialization of the associated switch ports. For example, when a fabric is powered on or when a switch is added to an existing fabric, each switch simultaneously begins to bring up all ports. This includes initializing all the ISLs connecting the ports to neighboring fabric switches. Bringing up each port associated with an ISL may involve establishing transmission speed, exchanging link parameters, initialize credit, exchanging lists of switch-to-switch protocols, link resetting, responding to security checks, etc., such that the ports associated with the ISL are activated and ready to proceed to fabric configuration.

Switches may have several ISLs connected between them. For example, the BROCADE® 5300 Switch can support up to 64 ISLs. Performing bringing up or initialization of each port associated with the ISLs requires considerable computing resources in the form of CPU cycle time and memory. Therefore, when a large number of ports are brought up at the same time, the peak resources requirement is very large. However, once the ports have been brought up and the switch has been brought to steady state operation, the need for resources declines considerably (typically by an order of magnitude).

Some efforts have been made to reduce the fabric configuration time once the ports associated with multiple ISLs between two switches have been activated, as discussed in U.S. Patent Application No. US 2006/0168109, entitled "Methods, devices and systems with improved zone merge operation by operating on a switch basis," which is hereby incorporated by reference. For example, the fabric configuration may involve zone merging on per-switch basis instead of per-port basis. In this case, the zone merge operation is carried out only once per switch pair, and only one ISL per switch pair is involved in the zone merge procedure. However, even the per-switch zone merge method requires that all the ISLs between any two switches be brought up a priori. Therefore it still does not address the problem of high peak resource requirements during port bring up.

Unfortunately, because faster fabric configuration is highly desirable, users are forced to select switching elements that have been designed for peak resource requirements—resulting in increased cost and complexity of the system, while at the same time resulting in underutilized computing resources after the transient peak requirements have receded. Alternatively, if the user decides to select switching elements that are not designed for peak resource requirements, the fabric configuration time increases considerably. In some cases the user is forced to manually initialize each switch one at a time in order to judiciously distribute limited computing resources. But this method requires manual intervention and takes even longer to bring up the network.

SUMMARY OF THE INVENTION

According the embodiments of the present invention, fabric configuration of a fabric including switches interconnected with multiple parallel interswitch links is improved.

In one embodiment, only one of the parallel interswitch links between any two switches in the fabric can be initialized. The ports associated with that ISL on each switch can also be initialized. The selection of the ISL from among multiple parallel ISLs can be carried out using various methods. In one embodiment, the port pairs that are the first to complete exchange of messages between the two switches can be selected for initialization. In another embodiment, the switch port pair providing the highest transmission rate can be selected for initialization. In yet another embodiment, a switch port pair can be selected at random. The ISLs and the associated ports that are not selected can be left un-initialized or disabled.

In one embodiment, the fabric can be configured with only one of the multiple parallel ISLs between any two switches. Fabric configuration can execute steps for selecting principal switch and exchanging switch parameters; distributing Domain IDs to each switch in the fabric; establishing zones; and performing path selection and establishing routes. Because the fabric configuration can be carried out without including the unselected ISLs and the associated ports, the peak computing resource requirement on each switch is considerably reduced. And because the available computing resources are expended in fabric configuration with only the selected ISLs, the fabric configuration time can be minimized.

In one embodiment, the unselected ISLs are enabled and initialized one by one after the fabric configuration is complete. In another embodiment, the available computing resources at the fabric can be monitored. A number of unselected ISLs appropriate for the available computing resources can be selected for initialization. This process can be repeated until all the previously unselected ISLs are initialized.

In one embodiment, the available computing resources can include the available computing resources of the switch or a pair of switches. In another embodiment, the available computing resources can include the available computing resources at the entire fabric.

BRIEF DESCRIPTION OF THE DRAWINGS

The present invention has other advantages and features which will be more readily apparent from the following detailed description of the invention and the appended claims, when taken in conjunction with the accompanying drawings, in which:

DETAILED DESCRIPTION OF THE PREFERRED EMBODIMENTS

Figure 1:
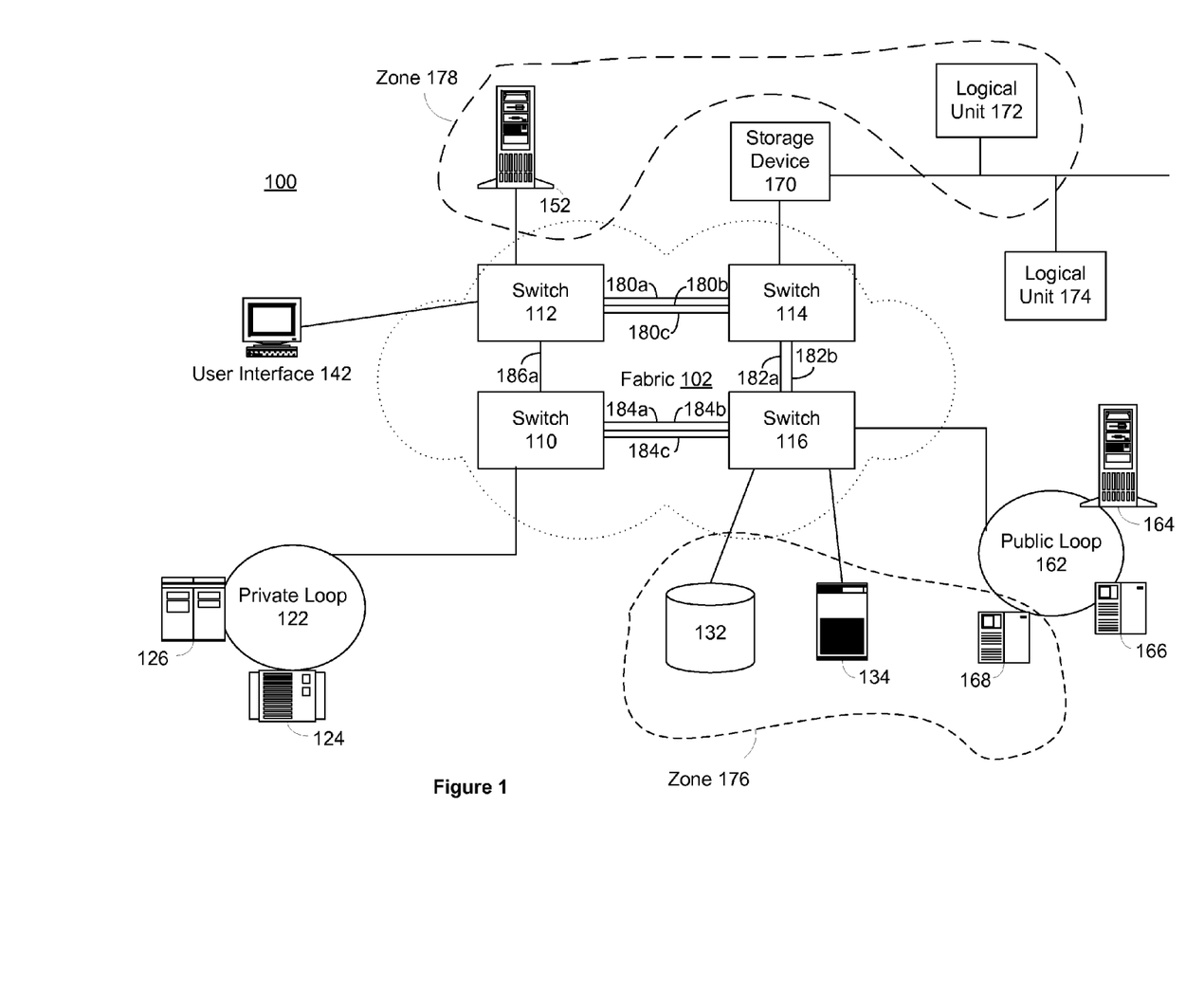
FIG. 1 illustrates a Fibre Channel network communication system utilizing parallel interswitch links.

FIG. 1 illustrates a Fibre Channel network 100 including various network, storage, and user devices. Generally, the network 100 can be connected using Fibre Channel connections (e.g., optical fiber and coaxial cable). In the embodiment shown and for illustrative purposes, the network 100 can include a fabric 102 comprised of four different switches 110, 112, 114, and 116. It will be understood by one of skill in the art that a Fibre Channel fabric may be comprised of one or more switches.

A variety of devices can be connected to the fabric 102. A Fibre Channel fabric can support both point-to-point and loop device connections. A point-to-point connection is a direct connection between a device and the fabric. A loop connection is a single fabric connection that supports one or more devices in an "arbitrated loop" configuration, wherein signals travel around the loop through each of the loop devices. Hubs, bridges, and other configurations may be added to enhance the connections within an arbitrated loop.

On the fabric side, devices can be coupled to the fabric via fabric ports. A fabric port (F_Port) can support a point-to-point fabric attachment. A fabric loop port (FL_Port) can support a fabric loop attachment. Both F_Ports and FL_Ports may be referred to generically as Fx_Ports. Typically, ports connecting one switch to another switch are referred to as expansion ports (E_Ports). In addition, generic ports may also be employed for fabric attachments. For example, G_Ports, which may function as either E_Ports or F_Ports, and GL_Ports, which may function as either E_Ports or Fx_Ports, may be used.

On the device side, each device coupled to a fabric constitutes a node. Each device can include a node port by which it is coupled to the fabric. A port on a device coupled in a point-to-point topology is a node port (N_Port). A port on a device coupled in a loop topology is a node loop port (NL_Port). Both N_Ports and NL_Ports may be referred to generically as Nx_Ports. The label N_Port or NL_Port may be used to identify a device, such as a computer or a peripheral, which is coupled to the fabric.

Loop devices (NL_Ports) coupled to a fabric may be either "public" or "private" devices that comply with the respective Fibre Channel standard (e.g., Fabric Loop Attach standard FC-FLA, or Fibre Channel Private Loop Direct Attach FC-PLDA, respectively). Those skilled in the art will be familiar with the configurations for enabling public and private devices to operate in compliance with ANSI specifications (e.g., X3.272 1996; T11 project 1133-D) and the NCITS specification (e.g., NCITS TR-20 1998; NCITS TR-19 1998).

In the embodiment shown in FIG. 1, fabric 102 can include switches 110, 112, 114 and 116 that are interconnected. Switch 110 can be attached to private loop 122, which can include devices 126 and 124. Switch 112 can be attached to device 152. Switch 114 can be attached to device 170, which has two logical units 172, 174 attached to device 170. Device 170 can be a storage device such as a RAID device, which in turn may be logically separated into logical units illustrated as logical units 172 and 174. Alternatively the storage device 170 could be a JBOD or just a bunch of disks device, with each individual disk being a logical unit. Switch 116 can be attached to devices 132 and 134, and is also attached to public loop 162, which can be formed from devices 164, 166 and 168 being communicatively coupled together. A user interface 142 can also connect to the fabric 102. Zone 176 can be configured within the fabric 102. Zone 176 can include devices 132, 134 and device 168, which forms a part of the arbitrated loop 162. Similarly, zone 178 can include device 152 and logical unit 172. A zone indicates a group of source and destination devices allowed to communicate with each other.

Switches 110, 112, 114, and 116 can be interconnected with one or more ISLs. Switch 110 and 112 can be interconnected via a single ISL—186a. Switches 112 and 114 can be interconnected via three ISLs—180a, 180b, and 180c. Switches 114 and 116 can be interconnected via two ISLs—182a and 182b. Switches 110 and 116 can be interconnected via three ISLs—184a, 184b, and 184c. The fabric can use link aggregation or trunking to form single logical links comprising parallel ISLs between two switches. For example, the ISLs 180a, 180b, and 180c can be aggregated into a single logical link between switches 112 and 114 with a bandwidth equal to the sum of bandwidth of the individual ISLs, as described further in U.S. Pat. No. 7,447,198, which is incorporated herein by reference in.

Figure 2:
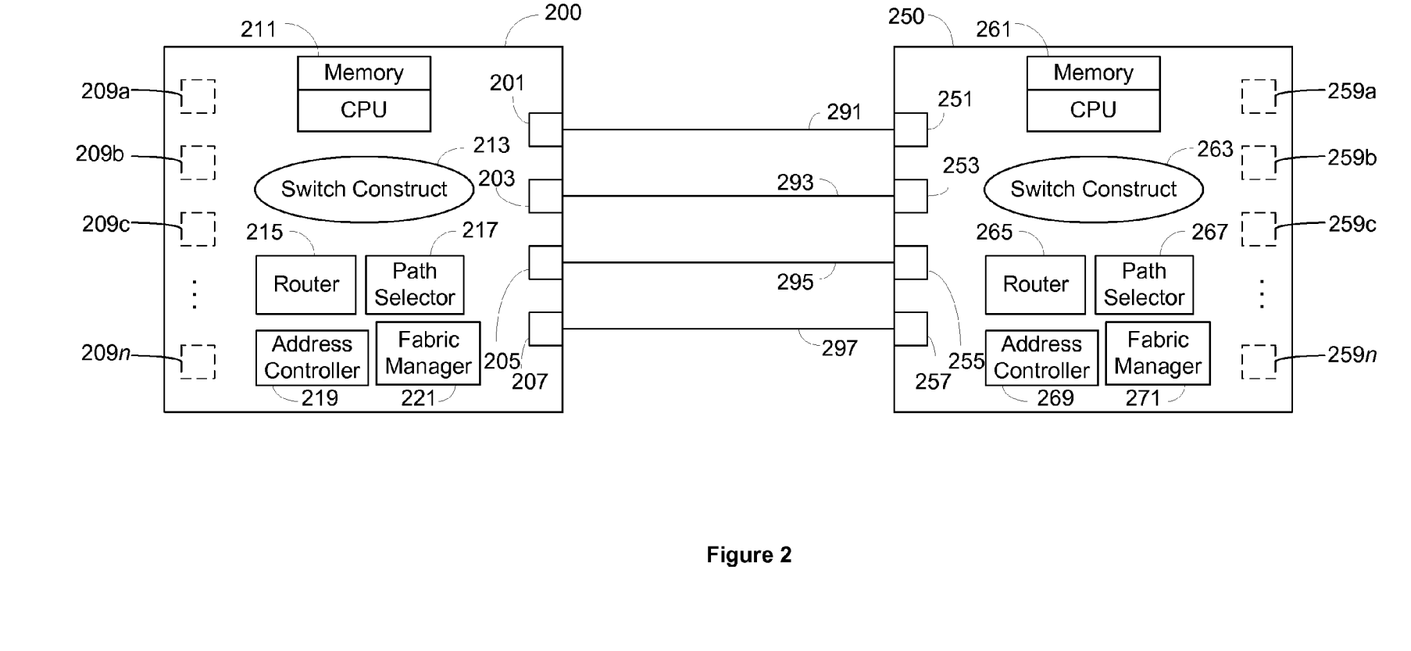
FIG. 2 show detailed views of two switches interconnected with parallel interswitch links.

FIG. 2 illustrates a pair of switches 200 and 250 interconnected with four parallel interswitch links (ISLs) 291, 293, 295, and 297. The switches 200 and 250 have been shown in isolation merely for the sake of illustration, and can be part of a fabric that includes additional switches. For example, switches 200 and 250 can be representative of any two switches (switch 110, switch 112, switch 114, or switch 116) shown in FIG. 1. Additionally, the number of ISLs connecting the switches 200 and 250 can be a number other than the four ISLs (291, 293, 295, and 297) shown in FIG. 2. The number of ISLs may depend upon the fabric design requirements, switch capabilities, etc. As an example, the BROCADE® 5300 Switch can support up to 64 ISLs. ISLs 291-297 are used by switches 200 and 250 to transmit and receive frames between each other. These frames can include data frames as well as fabric management frames.

Each ISL terminates at the respective E_Port of switches 200 and 250. As shown in FIG. 2, switch 200 can have four E_Ports 201, 203, 205, and 207 coupled with ISLs 291, 293, 295, and 297, respectively. Similarly, switch 250 can have four E_Ports 251, 253, 255, and 257 coupled with ISLs 291, 293, 295, and 297, respectively. A person skilled in the art will appreciate that the E_Ports shown in FIG. 2 may also be G_Ports, which are capable of operating as E_Ports. The switches 200 and 250 can have additional E/F/FL/B_Ports (209a-209n and 259a-259n) for connecting to various fabric components and endpoints. During port bring-up, each E_Port can determine whether it is connected to another E_Port of another switch via an ISL, and participate in initialization protocols that eventually lead to fabric configuration.

Each switch can also include a central processing unit (CPU) module (211 and 261) for controlling switch operation. The switches 200 and 250 can also include switch constructs (213 and 263), address controllers (219 and 269), path selectors (217 and 267), routers (215 and 265), and fabric managers (221 and 271). Switch constructs 213 and 263 transport frames between switch ports of their respective fabric switch. Address controllers 219 and 269 can obtain and assign domain IDs to their switches and also assign port or area IDs to the switch ports. The path selectors 217 and 267 can facilitate frame routing from a source to a destination within the fabric. Routers 215 and 265 can use the output of the path selectors 217 and 267 to develop routing tables and use the routing tables to determine appropriate output ports to route an incoming frame.

The CPU module 211 (261) can control the initialization of switch 200 (250), and can include one or more processors coupled with respective local memory modules. The processors may be any of various suitable processors, but is preferably the IBM PowerPC. E_Ports, 201, 203, 205, and 207 and 251, 253, 255, and 257, can all have associated state machines that determine their actions depending upon their current state and the received input signals. These state machines can be stored and controlled by the CPU modules 211 and 261. During switch initialization the switch ports traverse through various states depending upon their operating mode and the ports that they are connected to. The CPU module resources are utilized to monitor and control the states of each of the switch ports.

Figure 3:
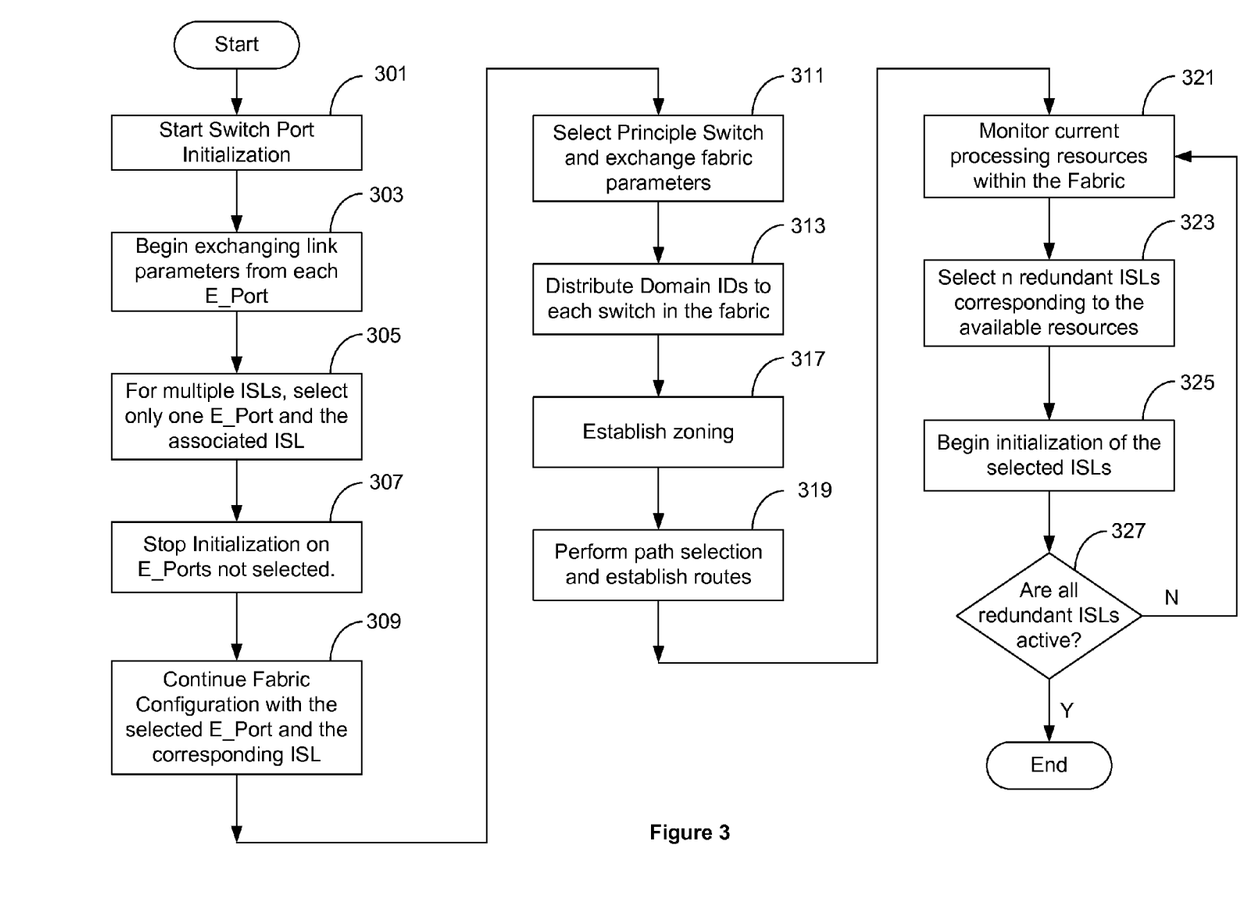
FIG. 3 shows a flowchart illustrating the process for staged bring-up of switch ports.

FIG. 3 illustrates a flowchart describing staged port bring-up. Upon a power-on event, the switches 200 and 250 can enter switch port initialization (step 301). Typically, with generic ports, such as G_Ports, the ports may first need to determine their operation mode. For example, if a G_Port on a switch is connected to another switch, it will be configured as an E_Port, or if the G_Port is connected to an endpoint, it will be configured as an F_Port. During initialization, a switch port may assume a mode for the purposes of determining if that mode is appropriate. If successful, the switch continues initialization in that mode. If unsuccessful, the switch port continues assuming other modes until it finds a mode in which to operate. For switch ports connected to other switch ports, like the ones shown in FIG. 2, the operation mode will eventually converge to an E_Port, and the E_Ports can subsequently enter link initialization.

In step 303, each E_Port 201, 203, 205, and 207 and 251, 253, 255, and 257 can transmit signals to E_Ports on the other end of their corresponding ISLs to achieve word synchronization and determine speed of transmission. The speed negotiation process can enable ports that are capable of multiple data transfer rates to determine maximum data transfer rate common to the ports and the links connecting the ports. Alternatively, the ports at both ends of an ISL may be configured to operate at a single transmission speed, in which case there may be no need for speed negotiation. The CPU modules (211 and 261 in FIG. 2) can maintain a speed negotiation state machine for each port capable of carrying out the speed negotiation process. Once a particular transmission speed has been established, the switch ports can move on to exchanging link parameters.

In step 303, E_Ports associated with each ISLs can start exchanging link parameters (ELP) that establishes the operating environment between the two E_Ports and the capabilities of the switches that are connected by the E_Ports. The transmission of ELP frames can take place on each E_Port connected to an ISL. Each ELP frame can include a port identifier, such as the world wide port name (WWPN), associated with the E_Port from which the ELP frame was transmitted. In addition, the ELP frame can also include a node identifier, such as the world wide node name (WWNN), associated with the switch to which the E_Port belongs to. ELP frames transmitted from E_Ports that connect to the same switch can have different WWPNs but same WWNN. For example, in FIG. 2, ELP frames transmitted from E_Ports 201, 203, 205, and 207 will have different WWPNs but the same WWNN. Similarly, ELP frames transmitted from E_Ports 251, 253, 255, and 257 will have different WWPNs but same WWNN. The WWNN of switch 200 will be different from the WWNN of switch 250.

Note that the CPU module can maintain the state of each of the E_Ports on the switch. Certain fabric configurations tasks such as link aggregation, link trunking, etc., can require that the E_Ports associated with each participating ISL be initialized. However, fabric discovery can be carried out with only one established link between the fabric components. For example, referring to FIG. 1, the fabric discovery process can be successfully carried out with only one of several links between Switch 112 and Switch 114, Switch 114 and Switch 116, and Switch 116 and Switch 110. The remaining redundant links can be disabled until after the fabric discovery process is completed. Because the switches are expending processing resources not in initializing all the redundant E_Ports but in only the optimal number necessary for successful fabric discovery, the peak processing load on the CPU module of the switches is considerably reduced.

Figure 4:
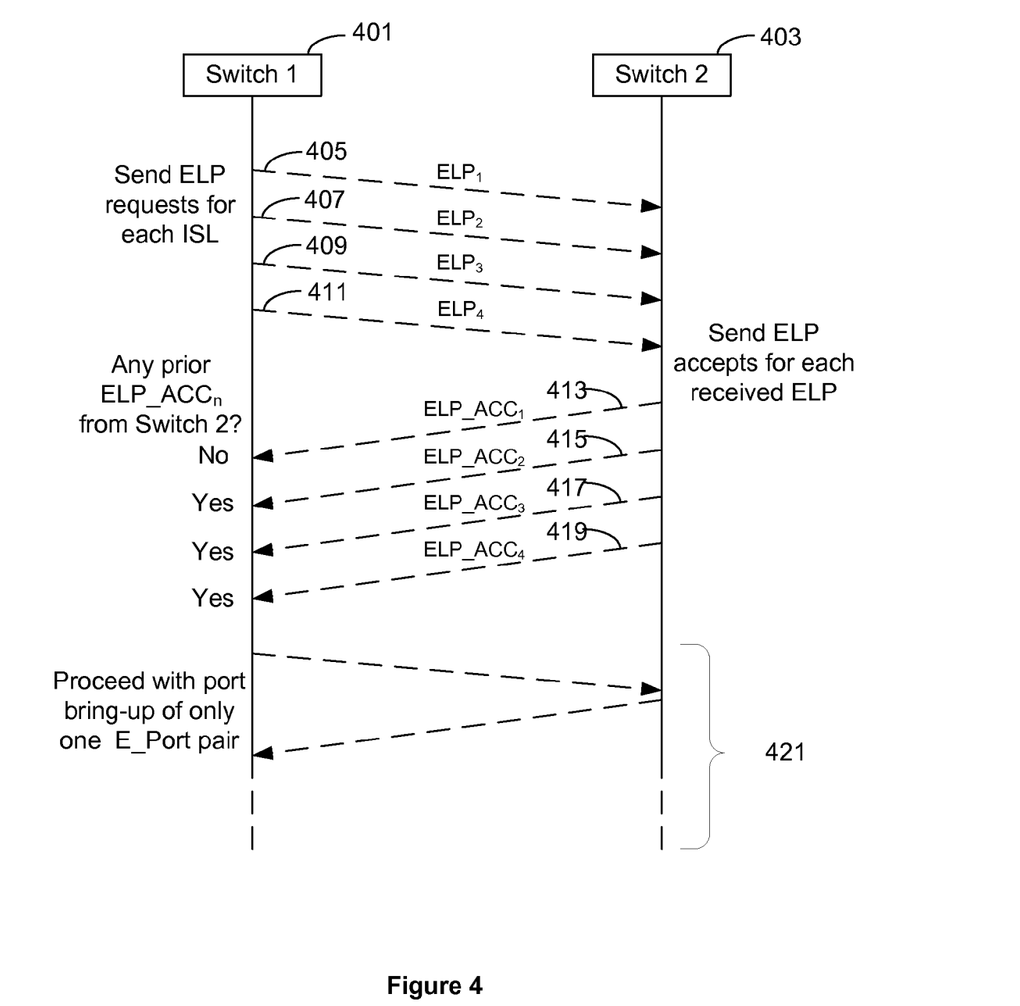
FIG. 4 illustrates the handshaking signals between two switches having parallel interswitch links.

Referring back to FIG. 3, in step 305, the CPU module selects only one ISL to be initiated. For example, in FIG. 2, all but one of the ISLs 291-297 can be disabled until the fabric discovery process is completed. FIG. 4 shows an example for selection of a single ISL based on the WWPNs of the E_Ports associated with the parallel ISLs. Switch 1 401 and Switch 2 403 are connected to each other by four ISLs (not shown). Switch 1 401 can transmit ELP frames ($ELP_1$ 405, $ELP_2$ 407, $ELP_3$ 409, and $ELP_4$ 411) on each of the four ISLs connecting Switch 2 403 for initiating exchanging of link parameters. Although FIG. 4 shows a particular sequential order in which ELP request frames are transmitted, i.e., $ELP_1$ 405-$ELP_2$ 407-$ELP_3$ 409-$ELP_4$ 411, such an order is only illustrative of this example. ELP request frames can be sent out on an ISL independent of the time of transmission of ELP request frames on other ISLs. Each ELP request frame payload can include the WWNN of Switch 1 401 as well as the WWPN of the transmitting E_Port. In addition, the payload can include parameters related to various classes of services provided by Switch 1 401, flow control parameters, etc.

When an E_Port on Switch 2 403 receives an ELP request frame, that E_Port can either reject the ELP request or accept the ELP request. The ELP request can be rejected if one or more parameters received in the ELP request frame are incompatible with the operation of the E_Port on Switch 2 403. Typically the ELP reject frame can include a reason code that the requester can use to determine the cause of rejection. If the parameters in the ELP request frame are acceptable, the E_Port on Switch 2 403 can reply with an ELP reply frame, ELP_ACC. The ELP reply frames are shown as $ELP\_ACC_1$ 413, $ELP\_ACC_2$ 415, $ELP\_ACC_3$ 417, and $ELP\_ACC_4$ 419 in FIG. 4. ELP reply frames can include the WWNN of Switch 2 403 and the WWPN of the corresponding E_Port. When the ELP reply frame is received by an E_Port at Switch 1 401, the CPU module can determine the WWNN and WWPN included in the ELP reply frame payload. At this point the CPU module can determine if another ELP_ACC frame has been received from another E_Port at Switch 2 403. For example, in FIG. 4, on receiving the $ELP\_ACC_1$ frame on E_Port1 of Switch 1 401, the CPU module checks if an $ELP\_ACC_n$ frame via any one of the other ISLs has been previously received. Because no such frame has been received, the CPU module in Switch 1 401 can store in memory the value of Switch 2's 403 WWNN with a flag or indicator that a first ELP accept frame has been received from that WWNN. The CPU module can also store the value of the WWPN from which the first ELP accept frame, $ELP\_ACC_1$ 413, has been received. The CPU module can now refer to this stored WWNN and the associated flag or indicator each time it receives an ELP accept frame via other ISLs.

As shown in FIG. 4, Switch 1 401 can receive an ELP_ACC$_2$ 415 frame from the E_Port connected to Switch 2 403 over ISL2 after receiving ELP_ACC$_1$ 413 over ISL1. On receiving ELP_ACC$_2$ 415, CPU module can determine the WWNN and the WWPN from the payload of the ELP_ACC$_2$ 415 frame. Because the ELP_ACC$_2$ 415 frame is sent from Switch 2 403, the WWNN included in its payload will match the WWNN stored by the CPU module. Because the flag associated with the stored WWNN of Switch 2 403 indicates that an ELP_ACC (the ELP_ACC$_1$ 413) frame has already been received from another ISL, the CPU module can halt the initialization of the E_Port associated with ISL2. Similarly, the CPU module can halt the initialization of E_Ports associated with ISL3 and ISL4 upon receiving the ELP accept frames ELP_ACC$_3$ 417 and ELP_ACC$_4$ 419. Therefore, by the above process the CPU module can halt the E_Port initialization of all but one E_Port pair connecting Switch 1 401 and Switch 2 403. Note that if Switch 1 401 were to receive the first ELP accept frame on ISL3 instead of ISL1 (as shown in FIG. 4) then the CPU module can halt the E_Port initialization of all but the E_Ports associated with ISL3. Typically, the E_Ports whose initialization has been halted are put in a disabled state where they can await initialization in the future.

Methods other than the one illustrated in FIG. 4 for selecting the number of E_Ports to bring-up are possible. For example, the selection criteria may be based on which E_Port has the highest bit transmission rate. And in case there is more than one E_Port with the same bit transmission rate, then the switch may select one randomly, or the one for which the ELP accept frame is received first, i.e., in combination with the method illustrated in FIG. 4. Alternatively, the E_Port having the lowest WWPN can be selected for initialization, or an E_Port can be chosen at random. As another alternative, if the available computing resources allow, the switch may also select a subset of available E_Ports for bring-up instead of just one. The CPU module resources may be monitored at the switch and the size of the subset of E_Ports for bring-up may be decided dynamically. Other criteria for selecting an E_Port for bring-up can be based on whether the E_Port is a Fibre Channel port or an Ethernet port. Also, port configuration, e.g., long distance port, can be utilized for selecting the E_Port to bring-up.

Returning to FIG. 4, once the E_Ports associated with ISL1 have been selected the CPU module can continue with E_Port bring-up with only ISL1 enabled between Switch 1 401 and Switch 2 403. Further steps in port bring-up may include exchanging various frames representing credit parameters, trunk parameters, switch capabilities, security attributes, fabric membership data, authentication protocols, fabric parameters, etc. If all these steps are successful, the E_Ports corresponding to ISL1 on Switch 1 401 and Switch 2 403 will be initialized or brought up and will be ready to participate in fabric configuration.

Although FIG. 4 discloses a scenario that includes only two switches, the selection of E_Ports to be initialized, and the redundant E_Ports to be disabled, can be carried out simultaneously on all switches having parallel ISLs. For example, Switch 114 in FIG. 1 can simultaneously carry out selection of an optimal number of ISLs between neighboring switches Switch 112 and Switch 116. Further, any one of a pair of switches can take up the task of determining the optimal E_Ports to bring up. For example, in FIG. 4, instead of Switch 1 401 selecting the E_Ports associated with ISL1 for bring-up, it can be Switch 2 403 that makes that determination. In such a case, it will be Switch 2 403 that will be sending out ELP request frames to Switch 1 401. In situations where both Switch 1 401 and Switch 2 403 simultaneously transmit ELP request frames to each other, one of the switches can prevail based on some predetermined arbitration criteria, e.g., the one having the lowest WWNN.

Returning to FIG. 3, the switches can continue with fabric configuration with the selected optimal E_Ports (step 309). For example, referring to FIG. 1, E_Ports connected to ISLs 180a, 182b, 184c, and 186a can be selected for initialization, while E_Ports connected to ISLs 180b, 180c, 182a, 184a, and 184b are disabled. In other words, E_Ports connected to only one ISL from a number of parallel ISLs between any two switches are selected for initialization. Because there is at least one link between any two switches in the fabric, such a condition is sufficient for the fabric to carry out the majority of fabric configuration operations. In addition, because the available computing resources are expended only on bringing up a pair of E_Ports per pair of interconnected switches, the amount of time to bring up these selected E_Ports is reduced as compared to when all the E_Ports connected to all the ISLs are simultaneously initialized. As a result, the fabric can enter and complete fabric configuration relatively faster.

Once the selected E_Ports have been initialized, the fabric can select a Principal Switch from the constituent switches of the fabric (step 311). For example, Fabric 102 in FIG. 1 can select one of the Switches 110, 112, 114, and 116 to assume Principal Switch status. The Principal Switch can be designated as the address manager for dynamically assigning Domain IDs to each switch. Typically, during principal switch selection, each switch transmits a build fabric (BF) message from each E_Port that has achieved switch port initialization and from which the switch as not received a separate BF message. Because only one of parallel ISLs between any two switches has been initialized, the switch can transmit BF messages over only one ISL between any pair of switches having parallel ISLs. This can result in the advantage of expending only a fraction of the computing resources needed when all of the parallel ISLs are included for principal switch determination.

After the BF messages are exchanged on each initialized ISL, each switch begins exchanging fabric parameter (EFP) sequences whose payload includes the respective switch's Switch Priority, Switch Name, and the Domain ID list. Each switch compares its own Switch Priority, Switch Name and Domain ID list stored to that of an adjacent switch. Given that there is no Domain ID overlap, the switch with the lowest Switch Priority and Switch Name can take over as the Principal Switch. Each switch can also store the E_Port through which it received an EFP with the lowest Switch Priority and Switch Name. The stored E_Port can become the Principal ISL, which is the first ISL in the path from the switch to the Principal Switch. Each switch can now request a Domain ID assignment from the Principal Switch.

Once the Principal Switch has been selected the Principal Switch can assume the role of Domain Address Manager. The Principal Switch can also transmit messages to all switches in the fabric notifying that it is ready to distribute Domain IDs (step 313). The switches can then send a request sequence via the Principal ISL including the requested Domain ID, or can request the Principal Switch to assign one. The Principal Switch can assign the switch with the requested Domain ID if the requested Domain ID has not already been assigned, or can assign a Domain ID from a pool of available Domain IDs. Once a switch receives a Domain ID, it assigns appropriate address identifiers to the initialized ports. Each time the Principal Switch assigns a Domain ID to a Switch, the Principal Switch can transmit EFP messages including an updated Domain ID List to all switches in the fabric.

When the fabric switches have Domain IDs, they can participate in zoning (step 317). For example, zones 176 and 178 shown in FIG. 1 can be established. Merge request and Merge response messages are used to merge and propagate Zoning Configurations when an ISL becomes available and Domain IDs have been assigned. Only one of parallel ISLs between any two switches can be employed to carry Merge request and Merge response messages, as disclosed in U.S. Patent Application No. US 2006/0168109, referenced above. Having only one ISL between any two switches involved in the merge operation can significantly reduce the time required for completing zoning. This is because if all the parallel ISLs and the associated ports between two switches were initialized (without trunking), a merge operation would be initiated for each of the parallel ISLs—where all but one of the parallel ISLs will be carrying redundant information.

Each switch pair exchanges zone configurations until the zone configuration is consistent across the entire fabric. Zoning can be either software based (soft zoning) or hardware based (hard zoning). In soft zoning, zoning can be enforced at a Name server only, while hardware zoning can be enforced at the Name server and at the switch ports. Hard zoning information is distributed to each activated port of each switch. Further discussion on zoning can be found in U.S. Patent Application No. US 2006/0168109, referenced above.

Next, the fabric can establish routes between devices connected to the fabric by executing path selection algorithms such as Fabric Shortest Path First (FSPF) (step 319). The path can be selected based on the smallest cost associated with transmitting a message from source to destination. The cost of a path can include the cost associated with each ISL that constitutes the path. The fabric can execute FSPF as soon as all the switches acquire Domain IDs. FSPF can first exchange Hello messages between all E_Port pairs connected by an ISL to assure that two-way communication is possible between the two E_Ports. The exchange of Hello messages is typically carried out for each E_Port pair that is connected by an ISL and has been initialized. Therefore, for parallel ISLs with only one ISL initialized, the Hello message exchange can take place on only one ISL per pair of switches. For example, if only ISL 180a is initialized between switches 112 and 114 in FIG. 1, then FSPF can exchange Hello messages between the E_Ports associated with ISL 180a only. There will be no Hello messages exchanged between E_Ports associated with ISLs 180b and 180c. Similarly, because only one ISL from a number of parallel ISLs have been initialized, the FSPF can exchange Hello messages over only one ISL per switch pair. As a result, the amount of messages exchanged and the associated computational resources are considerably reduced.

Once two-way communication by way of exchange of Hello messages is established over an ISL, the FSPF can carry out initial database synchronization of Link State Databases stored at each switch. The Link State Database can include link state information for each link connecting a switch to another switch in the form link state records (LSRs). Each LSR can include fields associated with link attributes such as link cost. During initial synchronization, two neighboring switches can exchange their most recent instances of their respective Link State Databases followed by updating of their Link State Databases. The Link State Database is exchanged between all neighboring switches until the Link State Database is consistent over all the switches in the Fabric. After initial synchronization of Link State Database, each switch is aware of the fabric topology. FSPF can then carry out path computation and build a routing table. At this time the fabric can begin to transfer data messages. Any changes in the fabric topology, for example, new ISLs being enabled between switches, can be carried out by exchanging LSRs of the new ISLs.

Available computing resources at each switch can be monitored in real time (step 321). The available resources can be determined as a function of measured quantities such as CPU load, available memory, etc. The determination of available computing resources may take into account only those switches interconnected with parallel interswitch links. As another alternative, the available computing resources can depend upon the computing resources of the entire fabric, or a selected portion of the fabric. The CPU module can access the memory to determine the number of redundant ISLs and the associated E_Ports that have been disabled. The memory can also include an estimate of the amount of computing resources necessary for the bring-up of each of the redundant E_Ports. Therefore, with the available resources known, the CPU module can calculate the appropriate (n) number of E_Ports that can be brought-up for the available resources (step 323). Initialization can then be invoked for the selected n E_Ports and the associated ISLs (step 325) while still monitoring the available resources. Once the selected E_Ports have been brought-up, the CPU module can access the memory to determine whether all the redundant E_Ports have now been brought up (step 327). If all the redundant E_Ports have not yet been brought up, then the CPU module goes back to determining the available resources (step 321), selecting an appropriate number of E_Ports for bring-up (step 323), and invoking initialization of the selected E_Ports (step 325) until all the redundant E_Ports and the associated ISLs have been activated. This results in incremental bring up of un-initialized E_Ports based on the available computing resources.

Alternatively, the CPU module may choose not to initialize all of the available redundant E_Ports. This could be, for example, because the bandwidth requirement has been met by initializing less than all of the available redundant E_Ports. As another alternative, only one pair of E_Ports connected by a parallel ISL can be selected for initialization at a time. When that pair of E_Ports is initialized, another pair of E_Ports can be selected for initialization, and so on, until a desired number of E_Ports and the associated parallel ISLs have been initialized. This may be carried out with or without monitoring the available computing resources on the fabric.

Additionally, the CPU module of one switch, for example CPU module 211 of switch 200, can request the currently available computing resources from the CPU module of the neighboring switch, for example, the CPU module 261 of switch 250 in FIG. 2. The CPU module 211 can now include the computing resources of the switch 250 in determining the number of redundant E_Ports to bring up simultaneously. For example, the CPU module 211 may invoke the initialization of a redundant E_Port only when there are sufficient computing resources on both switch 200 and switch 250.

The determination of the number and location of the E_Ports that need to be brought-up and the available computing resources can be carried out by an external fabric manager as well. Each switch in the fabric can be equipped with a management access point, which allows bi-directional communication between the switch and the fabric management entity. The fabric manager can communicate with each switch out of band to determine their available resources as well determine the number of redundant E_Ports associated with each switch. Once a determination is made that a certain number of redundant links can be brought-up with the current available resources, the fabric manger can instruct the corresponding switches to invoke initialization. As another alternative, the fabric manager can be a distributed entity where portions of the fabric manager are resident in multiple switches within the fabric. Each switch can also include an updateable database that indicates the status of ISLs between any two switches. The database can also indicate the currently available computing resources at each switch. The distributed fabric manager can then determine the optimal number of the E_Ports to bring-up based on available computing resources.

The bringing-up of previously disabled parallel ISLs and the associated E_Port pairs can be carried out by sending an initialization message from one of the E_Ports to the other E_Port. For example, the originating E_Port on switch 112 may invoke link initialization of previously disabled ISL 180c. The E_Ports associated with 180c may carry out speed negotiation before exchanging ELP messages. The E_Ports may then exchange switch parameters and other required primitives until they are initialized. Because by this stage (after fabric configuration) the Principal switch has already been determined and the switches 112 and 114 already have their Domain IDs, the fabric does not re-enter fabric configuration because of the new ISL 180c. Instead, switches 112 and 114 can assign addresses to E_Ports associated with ISL 180c locally.

The zone configuration is also unaltered by the bringing-up of the E_Ports associated with ISL 180c. Therefore, the fabric can maintain the existing zone configuration. As a result no rerun of the merge operation between switches 112 and 114 is necessary. The E_Ports can simply access the zoning information stored at the switch for any operation requiring zoning information.

A new ISL 180c between switches 112 and 114 can re-invoke the FSPF process. The FSPF can initiate resynchronization of the Link State Database stored on each switch of the fabric to reflect the initialization of ISL 180c. However, unlike initial database synchronization where the complete Link State Database is exchanged between switches, the update synchronization can involve transferring only the LSRs of the E_Ports associated with ISL 180c. Therefore, the bringing-up of 180c results in only incremental transfer of link state data over the fabric. Similarly, other parallel E_Ports that have been disabled can be brought-up until all the desired E_Port pairs have been initialized. Note that the bringing-up of the previously disabled E-Ports does not disrupt data transfer through the fabric.

Therefore, once the fabric has been configured, incremental or staged bring up of parallel ISLs and the associated E_Ports does not result in reconfiguration of the fabric. The zoning and the topology of the network remain the same. Although operations such as link aggregation or trunking may be re-executed with newly initialized parallel ISLs, these operations utilize only nominal computing resources as compared to the computing resources expended during fabric configuration. The fabric may also re-execute the path selection algorithm, such as FSPF, to reflect any changes in the cost associated with links. However, even the execution of FSPF requires only nominal computing resources. As a result, incrementally bringing up parallel ISLs and the associated E_Ports reduces the peak computing resource requirements during fabric configuration—reducing the total fabric configuration time.

Although staged port bring-up has been described above with respect to E_Ports, it can also be extended to other switch ports, for example, F-ports and FL-ports. For example, devices can be connected to a fabric via multiple parallel links between a multiple N_Ports on the device and an equal number of multiple F_Ports on a switch. During fabric configuration, only one of multiple parallel links between devices and the fabric can be enabled. Once fabric configuration is complete N_Port-F_Port pairs can be brought-up incrementally.

The above description is illustrative and not restrictive. Many variations of the invention will become apparent to those skilled in the art upon review of this disclosure. The scope of the invention should therefore be determined not with reference to the above description, but instead with reference to the appended claims along with their full scope of equivalents.

What is claimed is:

1. A method comprising:
    selecting and initializing only one of a plurality of parallel ports at a first switch within a fabric, wherein the plurality of parallel ports are connected to a second switch within the fabric; and
    performing initial fabric configuration operations with the only one of the plurality of parallel ports initialized, wherein the initial fabric configuration operations comprise:
        selecting a principal switch for the fabric;
        receiving a corresponding domain identifier (ID) at the first switch based on the selection of the principal switch;
        exchanging zone configurations between the first switch and the second switch after receiving corresponding domain ID; and
        establishing a plurality of routes within the fabric after receiving the corresponding domain ID.

2. The method of claim 1, further comprising:
    after performing the initial fabric configuration operations, incrementally selecting and initializing another one of the plurality of parallel ports until a required number of the parallel ports have been initialized.

3. The method of claim 1, further comprising:
    monitoring available computing resources; and
    after performing the initial fabric configuration operations, incrementally selecting and initializing a subset of the plurality of parallel ports at a given time based on the available computing resources at the given time until a required number of the parallel ports have been initialized.

4. The method of claim 3, wherein the monitoring available computing resources is performed by a fabric manager.

5. The method of claim 4, wherein the fabric manager operates out of band.

6. The method of claim 4, wherein the fabric manager is one portion of a distributed entity.

7. The method of claim 3, wherein the available computing resources is a function of computing resources of the entire fabric.

8. The method of claim 1, wherein selecting the only one port comprises:
    receiving initialization message acknowledgements at the plurality of parallel ports; and selecting one port from the plurality of parallel ports that receives the first initialization message acknowledgement as the only one port.

9. The method of claim 1, wherein selecting the only one port comprises selecting a port from the plurality of parallel ports that provides the highest transmission rate, has the lowest port identifier, or randomly selecting a port from the plurality of ports.

10. The method of claim 1, further comprising entering link initialization for the plurality of parallel ports at the first switch prior to selecting only one of the plurality of parallel ports, wherein entering link initialization comprises each parallel port exchanging link information with a corresponding port of the second switch, and wherein selecting and initializing only one of a plurality of parallel ports comprises stopping initialization of unselected parallel ports after entering link initialization.

11. A switch comprising:
a plurality of communication ports; and
a central processing unit (CPU) module coupled to the plurality of communication ports and programmed for:
selecting and initializing only one of a plurality of ports connected in parallel to a second switch, wherein the plurality of ports are a subset of the plurality of communication ports; and
performing initial fabric configuration operations with the only one of the ports connected in parallel initialized, wherein the initial fabric configuration operations include:
determining a principal switch for the fabric;
receiving a domain identifier (ID) from the selected principal switch;
exchanging zone configuration with the second switch after receiving the domain ID; and
determining a plurality of routes within the fabric after receiving the corresponding domain ID.

12. The switch of claim 11, wherein the CPU module is further programmed, after performing initial fabric configuration operations, to incrementally select and initialize another one of the plurality of ports connected in parallel until a required number of communication ports from the plurality of ports connected in parallel have been initialized.

13. The switch of claim 11, wherein the CPU module is further programmed for:
monitoring available computing resources; and
after performing initial fabric configuration operations, incrementally selecting and initializing a subset of the plurality of ports connected in parallel at a given time based on the available computing resources at the given time until a required number of communication ports from the plurality of ports connected in parallel have been initialized.

14. The switch of claim 13, wherein monitoring available computing resources comprises monitoring computing resources of the switch.

15. The switch of claim 13, wherein monitoring available computing resources of the fabric is performed by a fabric manager.

16. The switch of claim 15, wherein the fabric manager is a portion of a distributed entity.

17. The switch of claim 13, wherein the available computing resources are a function of available computing resources of the fabric.

18. The switch of claim 13, wherein the available computing resources are based on computing resources of the switch.

19. The switch of claim 11, wherein selecting the only one of the plurality of ports connected in parallel comprises:
receiving initialization message acknowledgements at the plurality of ports connected in parallel; and
selecting one communication port from the plurality of ports connected in parallel that receives the first initialization message acknowledgement.

20. The switch of claim 11, wherein selecting the only one of the plurality of ports connected in parallel comprises selecting a parallel communication port that provides a transmission rate higher than that of each of the other of the plurality of ports connected in parallel, selecting a communication port with an associated port identifier that is lower than that of each of the other of the plurality of ports connected in parallel, or randomly selecting a communication port from the plurality of ports connected in parallel.

21. The switch of claim 11, wherein the CPU module is further programmed for entering link initialization for the plurality of ports connected in parallel prior to selecting only one of the plurality of communication ports connected in parallel, wherein entering link initialization causes each port connected in parallel to exchange link information with a corresponding port of the second switch, and wherein selecting and initializing only one of the plurality of ports connected in parallel comprises stopping initialization of unselected ports connected in parallel after entering link initialization.

22. A method comprising:
entering link initialization for a plurality of parallel ports at a first switch within a fabric, wherein the plurality of parallel ports are connected to a second switch in the fabric, and wherein entering link initialization comprises each parallel port exchanging link information with a corresponding port of the second switch;
selecting only one of the plurality of parallel ports at the first switch after entering link initialization;
stopping initialization of unselected parallel ports; and
performing initial fabric configuration operations with the only one of the plurality of parallel ports initialized.

23. The method of claim 22, wherein selecting only one of the plurality of parallel ports comprises determining that the unselected parallel ports received initialization message acknowledgements after the only one port of the plurality of parallel ports received a first initialization message acknowledgement.

24. The method of claim 22, wherein the initial fabric configuration operations comprises:
selecting a principal switch for the fabric;
receiving a corresponding domain identifier (ID) at the first switch based on the selection of the principal switch;
exchanging zone configurations between the first switch and the second switch after receiving corresponding domain ID; and
establishing a plurality of routes within the fabric after receiving the corresponding domain ID.

25. The method of claim 24, further comprising: selecting and initializing a second port of the parallel ports after performing the initial fabric configuration operations, wherein initializing the second port does not alter the selection of the principal switch, the corresponding domain ID, and the zone configurations.

26. A switch comprising:
a plurality of communication ports;
at least one memory; and
at least one processor coupled to the plurality of communication ports and at least one memory, wherein the at least one memory comprises instructions when executed causes the at least one processor to:
enter link initialization for a plurality ports connected in parallel to a second switch, wherein the plurality of ports are a subset of the plurality of communication ports, wherein entering link initialization causes each port connected in parallel to exchange link information with a corresponding port of the second switch;
select only one of the plurality of ports connected in parallel after entering link initialization;
halt initialization of unselected ports connected in parallel; and
perform initial fabric configuration operations with the only one of the plurality of ports connected in parallel initialized.

27. The switch of claim 26, wherein the instructions to select only one of the plurality of ports connected in parallel comprises instructions, when executed, causes the at least one processor to determine that the unselected ports connected in parallel received initialization message acknowledgements after the only one port of the plurality of ports connected in parallel received a first initialization message acknowledgement.

28. The switch of claim 26, wherein the instructions to perform initial fabric configuration operations comprises instructions, when executed, causes the at least one processor to:
determine a principal switch for the fabric;
receive a domain identifier (ID) from the selected principal switch;
exchange zone configuration with the second switch after receiving the domain ID; and
determine a plurality of routes within the fabric after receiving the corresponding domain ID.

29. The switch of claim 28, wherein the instructions, when executed, causes the at least one processor to select and initialize a second port of the ports connected in parallel after performing the initial fabric configuration operations, wherein initializing the second port does not alter the selection of the principal switch, the corresponding domain ID, and the zone configurations.

* * * * *